(12) United States Patent
Vilkamo et al.

(10) Patent No.: US 12,439,220 B2
(45) Date of Patent: Oct. 7, 2025

(54) APPARATUS, METHODS AND COMPUTER PROGRAMS FOR ENABLING REPRODUCTION OF SPATIAL AUDIO SIGNALS

(71) Applicant: NOKIA TECHNOLOGIES OY, Espoo (FI)

(72) Inventors: Juha Vilkamo, Helsinki (FI); Mikko-Ville Laitinen, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 292 days.

(21) Appl. No.: 17/908,969

(22) PCT Filed: Feb. 23, 2021

(86) PCT No.: PCT/FI2021/050130
§ 371 (c)(1),
(2) Date: Sep. 2, 2022

(87) PCT Pub. No.: WO2021/176135
PCT Pub. Date: Sep. 10, 2021

(65) Prior Publication Data
US 2023/0096873 A1 Mar. 30, 2023

(30) Foreign Application Priority Data
Mar. 3, 2020 (GB) ...................................... 2003063

(51) Int. Cl.
*H04S 7/00* (2006.01)
*H04R 3/14* (2006.01)
(Continued)

(52) U.S. Cl.
CPC .............. *H04S 7/302* (2013.01); *H04R 3/14* (2013.01); *H04R 5/02* (2013.01); *H04S 3/008* (2013.01);
(Continued)

(58) Field of Classification Search
CPC ...... H04S 7/302; H04S 3/008; H04S 2400/01; H04S 2400/11; H04S 2400/13;
(Continued)

(56) References Cited

U.S. PATENT DOCUMENTS

2014/0133683 A1  5/2014 Robinson et al.
2015/0131966 A1  5/2015 Zurek et al.
(Continued)

FOREIGN PATENT DOCUMENTS

EP  3542546  9/2019
GB  2563635  12/2018
(Continued)

OTHER PUBLICATIONS

Extended European Search Report for European Application No. 21765461.5 dated Jun. 1, 2023, 6 pages.
(Continued)

*Primary Examiner* — Vivian C Chin
*Assistant Examiner* — Douglas J Suthers
(74) *Attorney, Agent, or Firm* — ALSTON & BIRD LLP

(57) ABSTRACT

An apparatus (101) for enabling reproduction of spatial audio signals. The apparatus comprises means for obtaining (401) audio signals (501) comprising one or more channels and obtaining (403) spatial metadata (503) relating to the audio signals (501). The spatial metadata (503) comprises information that indicates how to spatially reproduce the audio signals. The apparatus also comprises means for obtaining (405) information relating to a field of view of video (505) wherein the video is for display on a display (205) of a rendering device (201) and wherein the video is associated with the audio signals (501). The apparatus also comprises means for aligning (407) spatial reproduction of the audio signals based, at least in part, on the obtained spatial metadata (503), with objects (309A, 309B) in the
(Continued)

video according to the obtained information relating to the field of view of video; and enabling (409) reproduction of the audio signals based on the aligning (407).

20 Claims, 8 Drawing Sheets

(51) Int. Cl.
*H04R 5/02* (2006.01)
*H04S 3/00* (2006.01)

(52) U.S. Cl.
CPC ....... *H04S 2400/01* (2013.01); *H04S 2400/11* (2013.01); *H04S 2400/13* (2013.01); *H04S 2400/15* (2013.01); *H04S 2420/07* (2013.01)

(58) Field of Classification Search
CPC ... H04S 2400/15; H04S 2400/07; H04R 3/14; H04R 5/02
USPC .......................................................... 381/303
See application file for complete search history.

(56) References Cited

U.S. PATENT DOCUMENTS

| | | | |
|---|---|---|---|
| 2017/0347219 A1 | 11/2017 | McCauley et al. | |
| 2017/0372748 A1* | 12/2017 | McCauley | H04N 21/439 |
| 2017/0374486 A1 | 12/2017 | Killham et al. | |
| 2018/0007491 A1 | 1/2018 | Arrasvuori et al. | |
| 2018/0192222 A1 | 7/2018 | De Bruijn | |
| 2018/0234786 A1* | 8/2018 | Tsuji | H04S 7/40 |
| 2019/0005986 A1 | 1/2019 | Peters et al. | |
| 2020/0015028 A1* | 1/2020 | Pihlajakuja | H04S 7/30 |
| 2020/0053461 A1 | 2/2020 | Suenaga et al. | |
| 2021/0051430 A1 | 2/2021 | Eronen et al. | |
| 2022/0295212 A1 | 9/2022 | Vilkamo et al. | |

FOREIGN PATENT DOCUMENTS

| | | |
|---|---|---|
| JP | 2016039568 A | 3/2016 |
| WO | WO 2008/135049 A1 | 11/2008 |
| WO | WO 2018/091776 | 5/2018 |
| WO | WO 2019/086757 A1 | 5/2019 |
| WO | WO 2019/224292 A1 | 11/2019 |

OTHER PUBLICATIONS

International Search Report and Written Opinion for Patent Cooperation Treaty Application No. PCT/FI2021/050130 dated Jun. 23, 2021, 17 pages.

Schultz-Amling et al., "Acoustical Zooming Based On a Parametric Sound Field Representation", Convention Paper 8120, Audio Engineering Society, 128th Convention, (May 22-25, 2010), 9 pages.

Search Report for United Kingdom Application No. GB2003063.1 dated Sep. 3, 2020, 3 pages.

Vilkamo et al., "Optimized Covariance Domain Framework for Time-Frequency Processing of Spatial Audio", Journal of the Audio Engineering Society, vol. 61, No. 6, (Jun. 2013), 9 pages.

Office Action for Chinese Application No. 202180018537.9 dated Feb. 10, 2025, 18 pages.

Dov et al., "Audio-Visual Voice Activity Detection Using Diffusion Maps", IEEE/ACM Transactions on Audio, Speech, and Language Processing, vol. 23, No. 4, (Apr. 2015), 14 pages.

ISO MPEG: "Liaison statement from MPEG on defining profiles and levels for MPEG-H 3D audio with complete attachment—ISOIEC_23008-3_(E)_(DIS of 3DA)", DVB, Digital Video Broadcasting, C/O EBU—17A Ancienne Route—CH-1218 Grand Saconnex, Geneva—Switzerland vol. ISO/IEC JTC 1/SC 29, No. r1, Aug. 8, 2014, pp. 1-433.

Office Action for European Application No. 21765461.5 dated Apr. 9, 2025, 6 pages.

Office Action for Chinese Application No. 202180018537.9 dated Jun. 26, 2025, 17 pages.

Office Action for Chinese Application No. 202180018537.9 dated Aug. 15, 2025, 18 pages.

* cited by examiner

APPARATUS, METHODS AND COMPUTER PROGRAMS FOR ENABLING REPRODUCTION OF SPATIAL AUDIO SIGNALS

CROSS-REFERENCE TO RELATED APPLICATIONS

This application is a national phase entry of International Application No. PCT/FI2021/050130, filed Feb. 23, 2021, which claims priority to Great Britain Application No. 2003063.1, filed Mar. 3, 2020, the contents of which are hereby incorporated by reference in their entirety.

TECHNOLOGICAL FIELD

Examples of the disclosure relate to apparatus, methods and computer programs for enabling reproduction of spatial audio signals. Some relate to apparatus, methods and computer programs for enabling reproduction of spatial audio signals and associated video.

BACKGROUND

Rendering devices such as mobile phones, portable media player devices, tablet computers, laptop computers and other devices often have two or more loudspeakers that enable reproduction of stereophonic sound and one or more displays that enable the display of video. In such devices the mapping of an image onto the display may cause a misalignment between the position of a video object on the display and a perceived direction of an audio source as rendered by the loudspeakers.

BRIEF SUMMARY

According to various, but not necessarily all, examples of the disclosure there is provided, an apparatus comprising means for: obtaining audio signals comprising one or more channels; obtaining spatial metadata relating to the audio signals wherein the spatial metadata comprises information that indicates how to spatially reproduce the audio signals; obtaining information relating to a field of view of video wherein the video is for display on a display of a rendering device and wherein the video is associated with the audio signals; aligning spatial reproduction of the audio signals based, at least in part, on the obtained spatial metadata, with objects in the video according to the obtained information relating to the field of view of video; and enabling reproduction of the audio signals based on the aligning.

Aligning spatial reproduction of the audio signals may comprise processing a spatial audio output signal based, at least in part, on the obtained audio signals and the obtained spatial metadata, wherein the processing may be configured to use the obtained information relating to the field of view of video to align one or more spatial features of the output spatial audio signal with corresponding objects in the video.

Aligning spatial reproduction of audio signals may comprise modifying the spatial metadata by adjusting one or more parameters within the spatial metadata based on the obtained information relating to a field of view of video.

The rendering device may comprise two or more loudspeakers and the reproduction of the audio signals may be by the two or more loudspeakers of the rendering device.

Enabling reproduction of the spatial audio signals may comprise reproducing a first portion of the audio signals using a first type of playback procedure and reproducing a second portion of the audio signals using a second, different type of playback procedure wherein the aligning determines, at least in part, whether a spatial feature of the audio signal falls within the first portion or the second portion.

The first type of playback procedure may comprise amplitude panning. The second type of playback procedure may comprise crosstalk cancellation.

The first portion of audio signals comprises sound directions within a front region of the audio signal and the second portion of audio signals comprises sound directions outside of the front region of the audio signal.

The front region may comprise an area spanned by the two or more loudspeakers of the rendering device.

The playback procedures may be matched at a boundary between the first region and the second region.

The apparatus may comprise means for obtaining information relating to the positions of the two or more loudspeakers within the rendering device and using the information relating to the positions of two or more loudspeakers of the rendering device to determine boundaries of the first region and the second region.

Aligning spatial reproduction of the audio signals with objects in the video may cause sound directions near an edge of a field of view of the video to be reproduced to a direction corresponding to an edge of a display of the rendering device and aligning spatial reproduction of the audio signals with objects in the video causes sound directions that are within the field of view of the video but not near an edge of a field of view of the video to be reproduced with panning techniques nearer to a centre of the display of the rendering device.

The spatial metadata may comprise, for one or more frequency sub-bands; a sound direction parameter, and an energy ratio parameter.

At least one of the audio signals or video signals representing the video may be captured by the apparatus.

At least one of the audio signals or video signals representing the video may be captured by a separate capturing device and transmitted to the apparatus. At least one of the spatial metadata, information relating to a field of view of video may be transmitted to the apparatus from the capturing device.

According to various, but not necessarily all, examples of the disclosure there is provided, an apparatus comprising: at least one processor; and at least one memory including computer program code; the at least one memory and the computer program code configured to, with the at least one processor, cause the apparatus at least to perform; obtaining audio signals comprising one or more channels; obtaining spatial metadata relating to the audio signals wherein the spatial metadata comprises information that indicates how to spatially reproduce the audio signals; obtaining information relating to a field of view of video wherein the video is for display on a display of a rendering device and wherein the video is associated with the audio signals; aligning spatial reproduction of the audio signals based, at least in part, on the obtained spatial metadata, with objects in the video according to the obtained information relating to the field of view of video; and enabling reproduction of the audio signals based on the aligning.

According to various, but not necessarily all, examples of the disclosure there is provided a method comprising: obtaining audio signals comprising one or more channels; obtaining spatial metadata relating to the audio signals wherein the spatial metadata comprises information that indicates how to spatially reproduce the audio signals; obtaining information relating to a field of view of video wherein the video is for display on a display of a rendering device and wherein the video is associated with the audio signals; aligning spatial reproduction of the audio signals based, at least in part, on the obtained spatial metadata, with objects in the video according to the obtained information relating to the field of view of video; and enabling reproduction of the audio signals based on the aligning.

Aligning spatial reproduction of the audio signals may comprise processing a spatial audio output signal based, at least in part, on the obtained audio signals and the obtained spatial metadata, wherein the processing may be configured to use the obtained information relating to the field of view of video to align one or more spatial features of the output spatial audio signal with corresponding objects in the video.

Aligning spatial reproduction of audio signals may comprise modifying the spatial metadata by adjusting one or more parameters within the spatial metadata based on the obtained information relating to a field of view of video.

The rendering device may comprise two or more loudspeakers and the reproduction of the audio signals may be by the two or more loudspeakers of the rendering device.

Enabling reproduction of the spatial audio signals comprises reproducing a first portion of the audio signals using a first type of playback procedure and reproducing a second portion of the audio signals using a second, different type of playback procedure wherein the aligning determines, at least in part, whether a spatial feature of the audio signal falls within the first portion or the second portion. The first type of playback procedure may comprise amplitude panning. The second type of playback procedure may comprise crosstalk cancellation.

The first portion of audio signals may comprise sound directions within a front region of the audio signal and the second portion of audio signals may comprise sound directions outside of the front region of the audio signal. The front region may comprise an area spanned by the two or more loudspeakers of the rendering device. The playback procedures may be matched at a boundary between the first region and the second region.

The method may comprise obtaining information relating to the positions of the two or more loudspeakers within the rendering device and using the information relating to the positions of two or more loudspeakers of the rendering device to determine boundaries of the first region and the second region.

In the method aligning spatial reproduction of the audio signals with objects in the video may cause sound directions near an edge of a field of view of the video to be reproduced to a direction corresponding to an edge of a display of the rendering device and aligning spatial reproduction of the audio signals with objects in the video causes sound directions that are within the field of view of the video but not near an edge of a field of view of the video to be reproduced with panning techniques nearer to a centre of the display of the rendering device.

The spatial metadata may comprise, for one or more frequency sub-bands; a sound direction parameter, and an energy ratio parameter.

At least one of the audio signals or video signals representing the video may be captured by the rendering device.

At least one of the audio signals or video signals representing the video may be captured by a separate capturing device and transmitted to the rendering device.

At least one the spatial metadata and information relating to a field of view of video may be transmitted to the rendering device from the capturing device.

According to various, but not necessarily all, examples of the disclosure there is provided a computer program comprising computer program instructions that, when executed by processing circuitry, cause: obtaining audio signals comprising one or more channels; obtaining spatial metadata relating to the audio signals wherein the spatial metadata comprises information that indicates how to spatially reproduce the audio signals; obtaining information relating to a field of view of video wherein the video is for display on a display of a rendering device and wherein the video is associated with the audio signals; aligning spatial reproduction of the audio signals based, at least in part, on the obtained spatial metadata, with objects in the video according to the obtained information relating to the field of view of video; and enabling reproduction of the audio signals based on the aligning.

Enabling reproduction of the spatial audio signals may comprise reproducing a first portion of the audio signals using a first type of playback procedure and reproducing a second portion of the audio signals using a second, different type of playback procedure wherein the aligning determines, at least in part, whether a spatial feature of the audio signal falls within the first portion or the second portion.

BRIEF DESCRIPTION

Some examples will now be described with reference to the accompanying drawings in which.

Figure 7A:
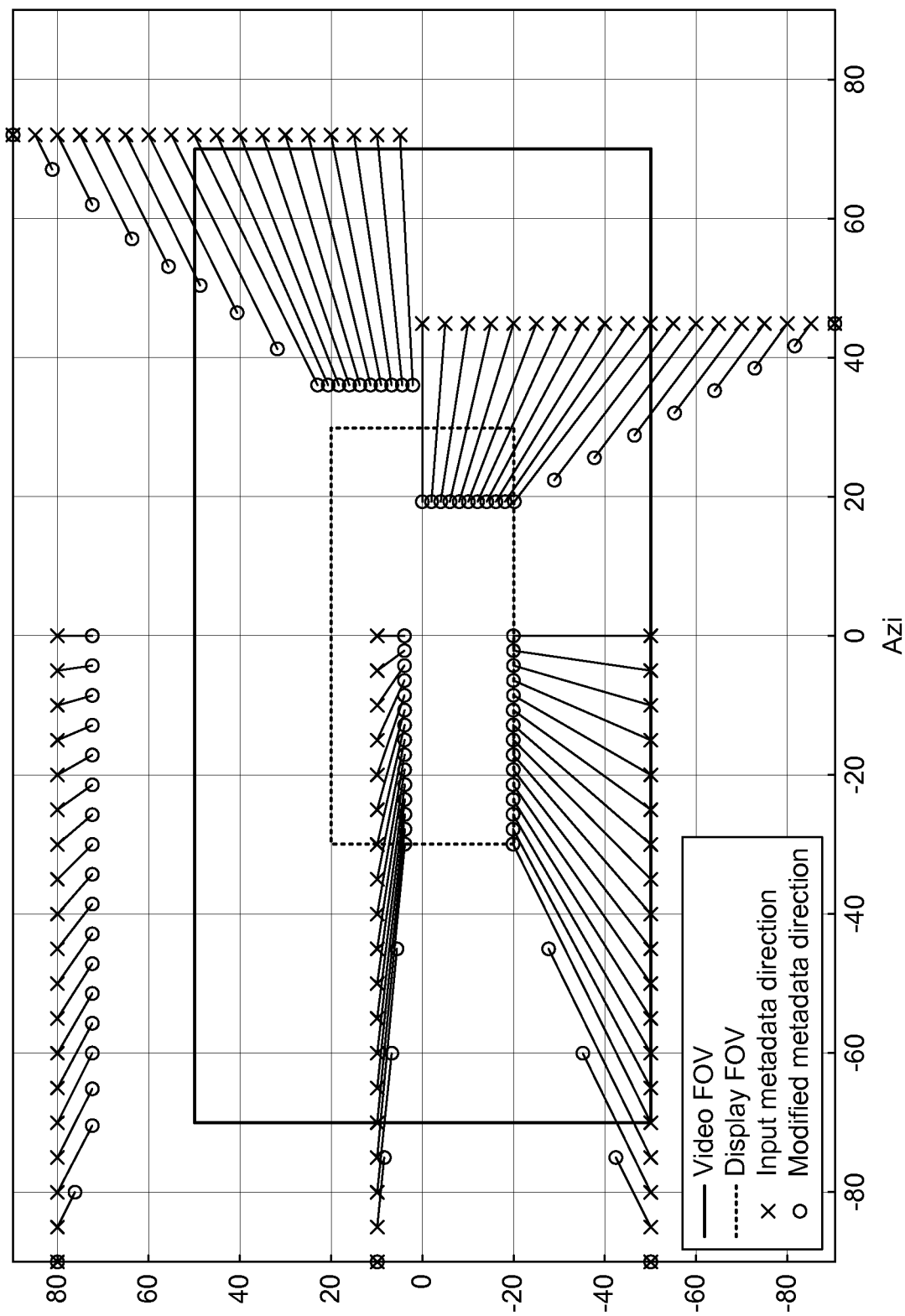
Figure 7B:
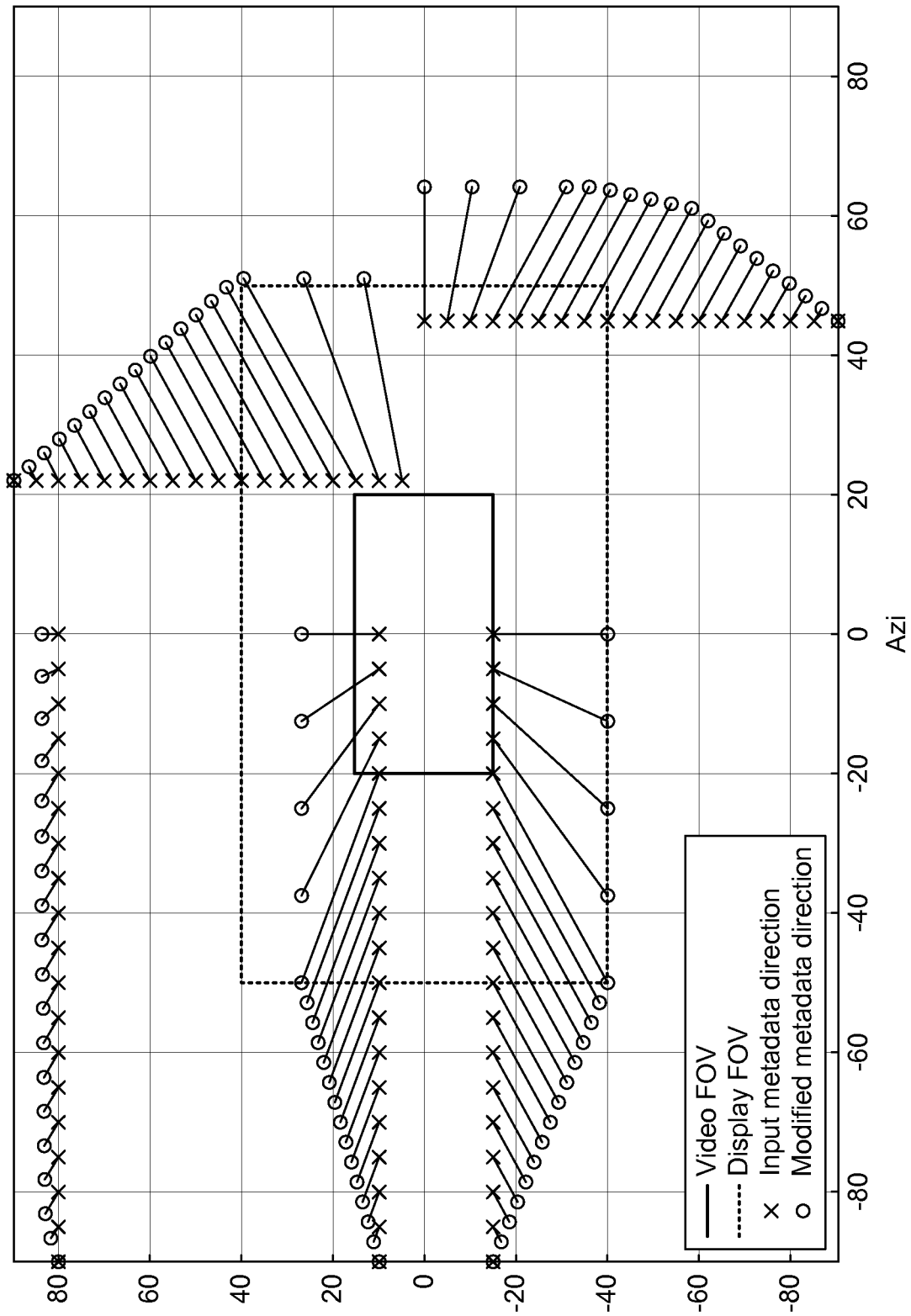

FIGS. 7A and 7B schematically illustrate modified spatial metadata.

DETAILED DESCRIPTION

The figures illustrate an apparatus 101 which may be configured to enable reproduction of spatial audio signals. The apparatus 101 comprises means for obtaining 401 audio signals 501 where the audio signals 501 comprise one or more channels. The apparatus 101 also comprises means for obtaining spatial metadata 503 relating to the audio signals 501. The spatial metadata 503 comprises information that indicates how to spatially reproduce the audio signals. The apparatus 101 also comprises means for obtaining information related to a field of view of video 505. The video is for display on a display 205 of a rendering device 201. In some examples the rendering device 201 comprises two or more loudspeakers 203. The video is associated with the audio signals 501. The apparatus 101 also comprises means for aligning spatial reproduction of the audio signal based, at least in part, on the obtained spatial metadata, with objects in the video according to the obtained information relating to the field of view of video. The aligning of spatial reproduction of audio signals can comprise modifying 407 the obtained spatial metadata 503, based on the obtained information related to a field of view of video 505 to, at least in part, align directions within a spatial reproduction of the one or more audio signals 501 with objects in the video. The apparatus 101 also comprises means for enabling reproduction 409 of the audio signals 501 based on the aligning.

The apparatus 101 may be for enabling reproduction of audio signals.

The apparatus 101 according to examples of the disclosure therefore enables the spatial metadata 503 of the audio signals to be modified. The modification of the spatial metadata 503 can cause a change in directions or other spatial information associated with the audio signals 501. This change in directions or other spatial information of the audio signals 501 can improve the alignment of the reproductions of the audio signals 501 with any video objects displayed on the display 205 of the rendering device 201. This provides an improved audio experience for a user 301 of the rendering device 201.

The figures illustrate an apparatus 101 comprising means for obtaining spatial metadata associated with spatial audio content. The spatial audio content may represent immersive audio content or any other suitable type of content. The means may also be configured for obtaining a configuration parameter indicative of a source format of the spatial audio content; and using the configuration parameter to select a method of compression of the spatial metadata associated with the spatial audio content.

The apparatus 101 may be for recording and/or processing captured audio signals.

Figure 1:
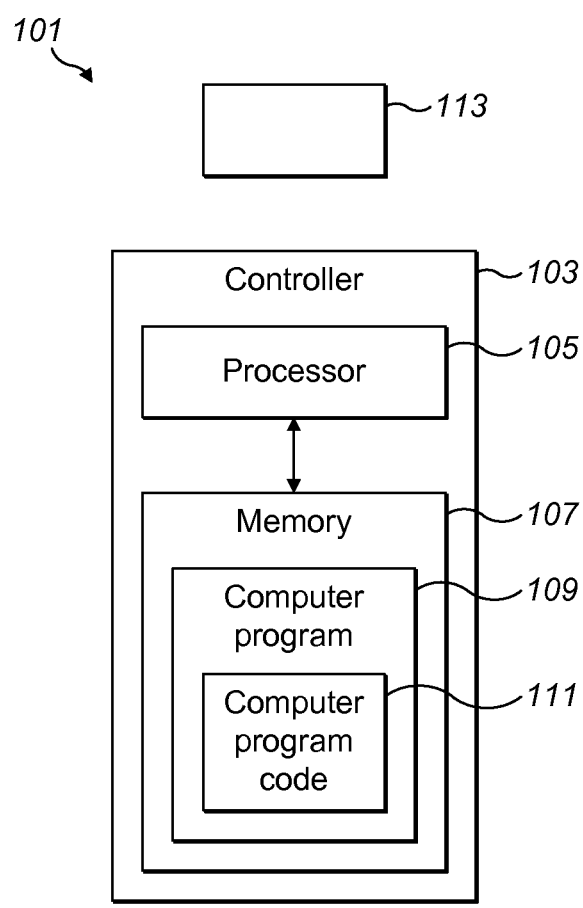
FIG. 1 illustrates an example apparatus.

FIG. 1 schematically illustrates an apparatus 101 according to examples of the disclosure. The apparatus 101 illustrated in FIG. 1 may be a chip or a chip-set. In some examples the apparatus 101 may be provided within devices such as a processing device. In some examples the apparatus 101 may be provided within an audio capture device or an audio rendering device.

In the example of FIG. 1 the apparatus 101 comprises a controller 103. In the example of FIG. 1 the implementation of the controller 103 may be as controller circuitry. In some examples the controller 103 may be implemented in hardware alone, have certain aspects in software including firmware alone or can be a combination of hardware and software (including firmware).

As illustrated in FIG. 1 the controller 103 may be implemented using instructions that enable hardware functionality, for example, by using executable instructions of a computer program 109 in a general-purpose or special-purpose processor 105 that may be stored on a computer readable storage medium (disk, memory etc) to be executed by such a processor 105.

The processor 105 is configured to read from and write to the memory 107. The processor 105 may also comprise an output interface via which data and/or commands are output by the processor 105 and an input interface via which data and/or commands are input to the processor 105.

The memory 107 is configured to store a computer program 109 comprising computer program instructions (computer program code 111) that controls the operation of the apparatus 101 when loaded into the processor 105. The computer program instructions, of the computer program 109, provide the logic and routines that enables the apparatus 101 to perform the methods illustrated in FIGS. 4 to 6. The processor 105 by reading the memory 107 is able to load and execute the computer program 109.

The apparatus 101 therefore comprises: at least one processor 105; and at least one memory 107 including computer program code 111, the at least one memory 107 and the computer program code 111 configured to, with the at least one processor 105, cause the apparatus 101 at least to perform: obtaining 401 audio signals comprising one or more channels; obtaining 403 spatial metadata 503 relating to the audio signals 501 wherein the spatial metadata 503 comprises information that indicates how to spatially reproduce the audio signals 501; obtaining 405 information 505 relating to a field of view of video wherein the video is for display on a display 205 of a rendering device 201 and wherein the video is associated with the audio signals 501; aligning spatial reproduction of the audio signals based, at least in part, on the obtained spatial metadata, with objects in the video according to the obtained information relating to the field of view of video; and enabling 409 reproduction of the audio signals based on the aligning.

As illustrated in FIG. 1 the computer program 109 may arrive at the apparatus 101 via any suitable delivery mechanism 113. The delivery mechanism 113 may be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid state memory, an article of manufacture that comprises or tangibly embodies the computer program 109. The delivery mechanism may be a signal configured to reliably transfer the computer program 109. The apparatus 101 may propagate or transmit the computer program 109 as a computer data signal. In some examples the computer program 109 may be transmitted to the apparatus 101 using a wireless protocol such as Bluetooth, Bluetooth Low Energy, Bluetooth Smart, 6LoWPan (IP$_v$6 over low power personal area networks) ZigBee, ANT+, near field communication (NFC), Radio frequency identification, wireless local area network (wireless LAN) or any other suitable protocol.

The computer program 109 comprises computer program instructions for causing an apparatus 101 to perform at least the following: obtaining 401 audio signals comprising one or more channels; obtaining 403 spatial metadata 503 relating to the audio signals 501 wherein the spatial metadata 503 comprises information that indicates how to spatially reproduce the audio signals 501; obtaining 405 information 505 relating to a field of view of video wherein the video is for display on a display 205 of a rendering device 201 and wherein the video is associated with the audio signals 501; aligning spatial reproduction of the audio signals based, at least in part, on the obtained spatial metadata, with objects in the video according to the obtained information relating to the field of view of video; and enabling 409 reproduction of the audio signals based on the aligning.

The computer program instructions may be comprised in a computer program 109, a non-transitory computer readable medium, a computer program product, a machine readable medium. In some but not necessarily all examples, the computer program instructions may be distributed over more than one computer program 109.

Although the memory 107 is illustrated as a single component/circuitry it may be implemented as one or more separate components/circuitry some or all of which may be integrated/removable and/or may provide permanent/semi-permanent/dynamic/cached storage.

Although the processor 105 is illustrated as a single component/circuitry it may be implemented as one or more separate components/circuitry some or all of which may be integrated/removable. The processor 105 may be a single core or multi-core processor.

References to "computer-readable storage medium", "computer program product", "tangibly embodied computer program" etc. or a "controller", "computer", "processor" etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term "circuitry" may refer to one or more or all of the following:
(a) hardware-only circuitry implementations (such as implementations in only analog and/or digital circuitry) and
(b) combinations of hardware circuits and software, such as (as applicable):
(i) a combination of analog and/or digital hardware circuit(s) with software/firmware and
(ii) any portions of hardware processor(s) with software (including digital signal processor(s)), software, and memory(ies) that work together to cause an apparatus, such as a mobile phone or server, to perform various functions and
(c) hardware circuit(s) and or processor(s), such as a microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

Figure 2A:
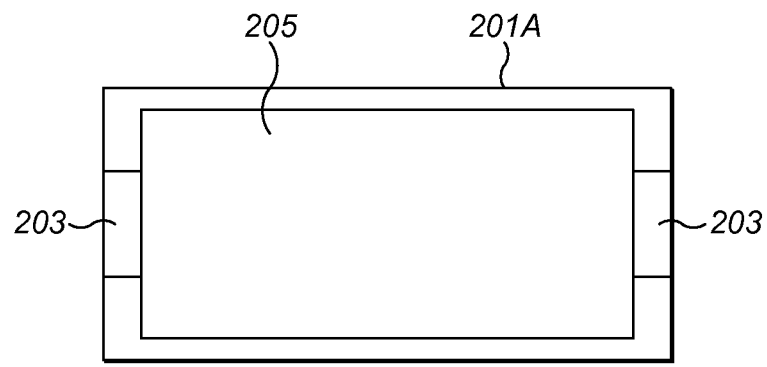
FIGS. 2A and 2B illustrate example rendering devices.
Figure 2B:
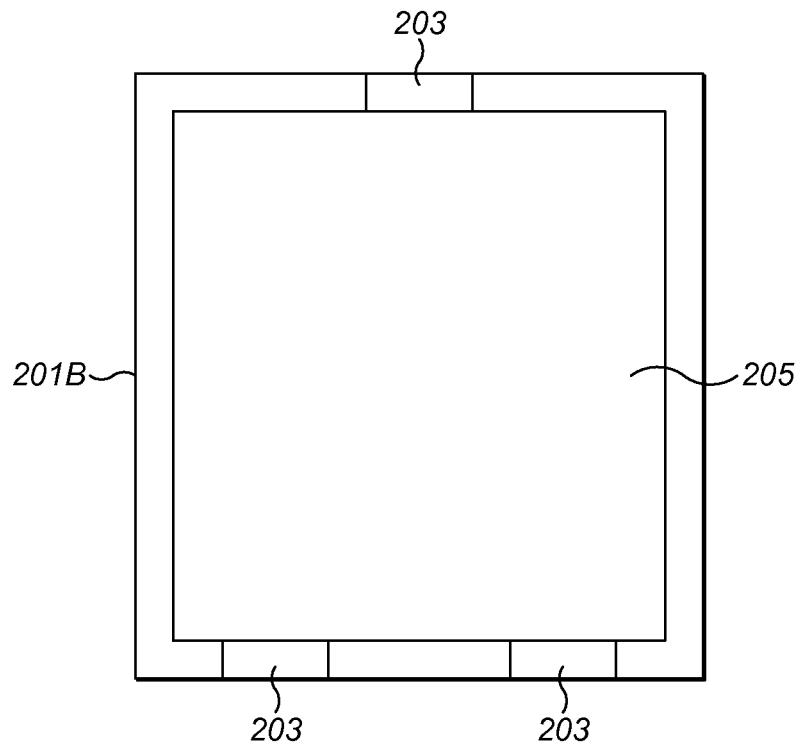

FIGS. 2A and 2B illustrate a plan view of example rendering devices 201A, 201B according to examples of the disclosure. The example rendering devices 201A, 201B comprise a controller 103 and apparatus 101 as illustrated in FIG. 1. The apparatus 101 and controller 103 would be located within the casing of the rendering devices 201A, 201B and so are not shown in FIGS. 2A and 2B.

The rendering devices 201A, 201B may be hand portable rendering devices. The rendering device 201A in FIG. 2A may be a mobile telephone while the rendering device 201B in FIG. 2B may be a tablet computer. Other types of rendering devices 201A, 201B may be used in other examples of the disclosure.

The rendering devices 201A, 201B each comprise two or more loudspeakers 203 and at least one display 205. The loudspeakers 203 and the display 205 are integrated within the rendering device 201A, 201B. That is, the loudspeakers 203 and the display 205 are housed within the same casing as the apparatus 101 and controller 103. The apparatus 101 and controller 103 are configured to control the loudspeakers 203 and the display 205. For example the apparatus 101 may control the loudspeakers 203 to enable spatial audio to be rendered and may control the displays 205 to enable video, or any other suitable visual information, to be rendered. The apparatus 101 and controller 103 may also be configured to control other functions of the rendering devices 201A, 201B such as communications functions or any other suitable functions.

The display 205 comprises means for presenting information to a user of the rendering device 201A, 201B. The display 205 may be configured to display video or any other suitable type of visual information. The display 205 could be a touch screen display or any other suitable type of display 205.

In the examples shown in FIGS. 2A and 2B the display 205 is provided on the front of the rendering device 201A, 201B. The display 205 may be positioned on the front of the rendering device 201A, 201B so that the display 205 covers most of the front surface of the rendering device 201A, 201B.

In the examples shown in FIGS. 2A and 2B the display 205 may be flat or substantially flat. In some examples the display 205 may comprise a flat portion and one or more curved portions. For example, the display 205 could comprise a flat portion on the front surface of the rendering device 201A, 201B and one or more curved portions that extend over one or more edges of the rendering device 201A, 201B.

The loudspeakers 203 may comprise any means which may be configured to convert an electrical input signal to an audible output signal. The loudspeakers 203 may enable reproduction of spatial audio signals so that a user of the rendering device 201A, 201B can listen to the spatial audio. The positioning of the loudspeakers 203 within the rendering device 201 may enable the rendering of spatial audio. The spatial audio signals comprise audio signals and associated spatial metadata which indicates how the audio signals should be reproduced spatially.

In the example of FIG. 2A the rendering device 201A comprises two loudspeakers 203. A first loudspeaker 203 is provided at one end of the rendering device 201A and a second loudspeaker 203 is provided at an opposing end of the rendering device 201A. The loudspeakers 203 are provided around edges of the display 205.

The example rendering device 201B of FIG. 2B has a different arrangement for the loudspeakers 203. The rendering device of FIG. 2B comprises three loudspeakers 203. A first loudspeaker 203 is provided at one end of the rendering device 201B and two other loudspeakers 203 are provided at an opposing end of the rendering device 201B. The loudspeakers 203 are provided around edges of the display 205 in a triangular arrangement.

It is to be appreciated that the configurations of the displays 205 and loudspeakers 203 shown in FIGS. 2A and 2B are examples and that other configurations could be used in other examples of the disclosure. It is also to be appreciated that only components referred to in the following description have been shown in FIGS. 2A and 2B and that in examples of the disclosure the rendering devices 201A, 201B may comprise components that have not been shown in FIGS. 2A and 2B. For instance, in some examples, the rendering devices 201A, 201B may comprise one or more cameras and microphones which may enable video and accompanying spatial audio signals to be captured. In some examples the rendering devices 201A, 201B may comprise transceivers which may be configured to receive video and accompanying spatial audio signals.

Figure 3A:
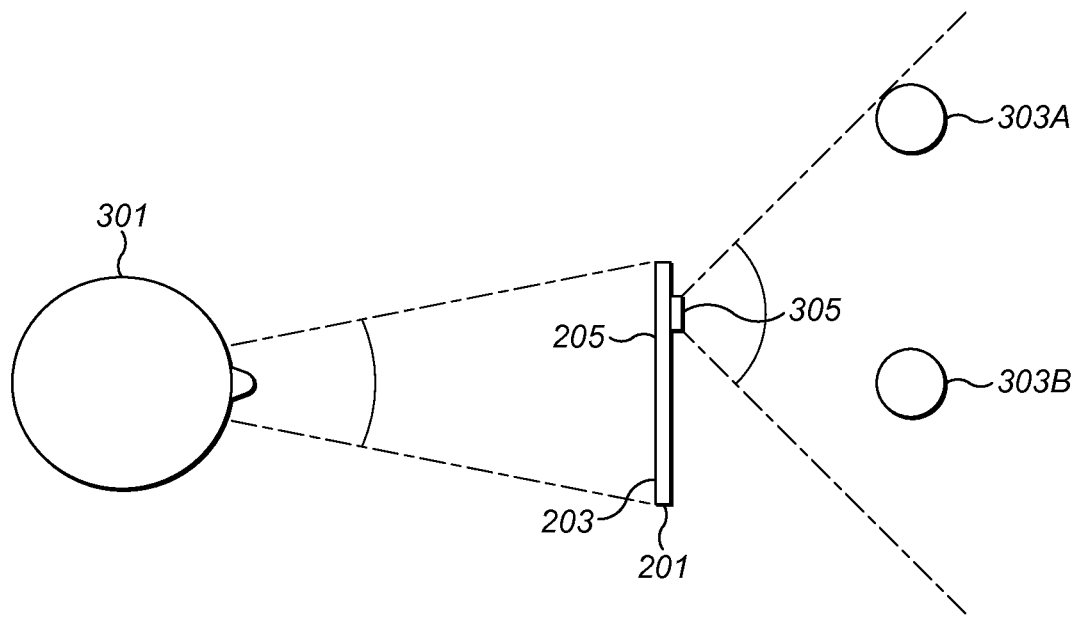
FIGS. 3A and 3B illustrate example fields of view of rendering devices
Figure 3B:
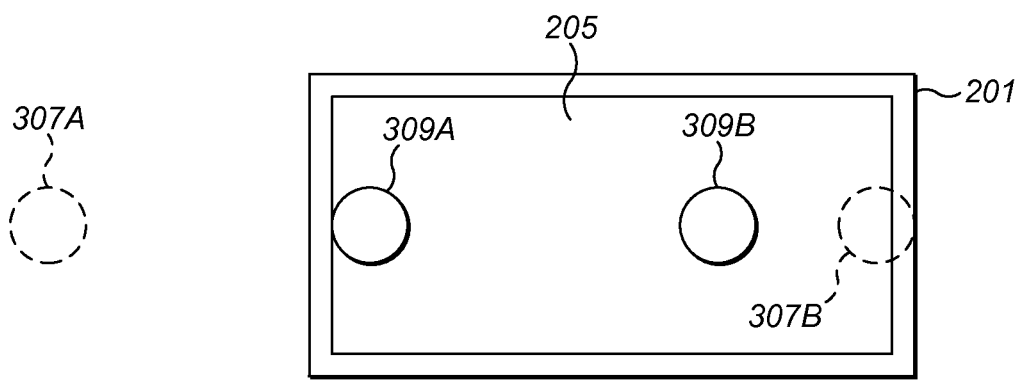

FIGS. 3A and 3B illustrate how a difference in the field of view of a camera and video and a view angle of a display 205 can lead to a discrepancy between the perceived sounds in the spatial audio and perceived video displayed on the displays 205 of rendering devices 201A, 201B such as those shown in FIGS. 2A and 2B.

FIG. 3A shows a user 301 using a rendering device 201 to capture video and associated spatial audio. The rendering device 201 being used to capture the video and associated spatial audio could be a rendering device 201A, 201B as shown in FIGS. 2A and 2B or could be any other suitable type of device.

The rendering device 201 in FIG. 3A comprises a camera 305. The camera 305 may be provided on an opposing surface of the rendering device 201 to the display 205. This may enable a user 301 of the rendering device 201 to view images on the display 205 as they are being captured by the camera 305 and/or at a playback stage. In other examples the camera 305 could be provided on the same surface of the rendering device 201 as the display 205.

The rendering device 201 may also comprise a plurality of microphones which are configured to capture audio signals. The plurality of microphones may be configured to enable spatial audio signals to be captured. For example, the positions of the plurality of microphones may be distributed through the rendering device 201 so as to enable spatial audio to be captured. For instance, the microphone arrangement could comprise one microphone near the camera 305, a second near the ear speaker, and a third at the far edge with respect to the ear speaker. The spatial audio that is based on the signals captured by the microphones comprises audio signals comprising one or more channels and spatial metadata which can be rendered so that a user of the rendering device 201 can perceive spatial properties of the one or more audio signals.

For example, the spatial audio may be rendered so that a user can perceive spatial properties such as the direction of arrival and the distance from an audio source.

In the example of FIG. 3A the camera 305 of the rendering device 201 is being used to capture video comprising a first source 303A and a second source 303B. The sources 303A, 303B provide sound that can be captured by the microphones and also an image object that can be viewed on the display 205. The image objects can be objects within the video. The objects within the video could be visual representations of objects that are emitting sound. For instance, the sources 303A, 303B could be objects such as people talking, people playing musical instruments, vehicles or any other suitable sources of sound.

The sources 303A, 303B are spatially distributed within the field of view of the camera 305 and so will be within the field of view of video captured by the camera 305. In the example of FIG. 3A the camera 305 has a field of view that spans an angle of approximately 76 degrees. The first source 303A is positioned close to an edge of this field of view so that the first source 303A is positioned at a location approximately 38 degrees from the left from the centre direction of the camera 305. The second source 303B is positioned closer to the centre of the field of view of the camera 305 and so is positioned closer to the centre direction of the camera 305. In the example shown in FIG. 3A the second source 303B could be positioned at a location approximately 16 degrees to the right of the centre direction of the camera 305.

When the microphones capture the audio signals from the sources 303A, 303B the spatial analysis of these audio signals will show that the audio from the first source 303A mainly arrives from a direction which is approximately 38 degrees from the left from the centre direction of the camera 305. The spatial analysis will also show that the audio from the second source 303B mainly arrives from a direction which is close to the centre direction of the camera 305.

In the example of FIG. 3A the angle of the field of view of the camera 305 is wider than the user's 301 view angle of the display 205 at a typical viewing distance. In the example of FIG. 3A the user's view angle is approximately thirty degrees. FIG. 3B illustrates the user's view of the display 205 when the display 205 is showing the video captured by the camera 305.

In FIG. 3B two video objects 309A, 309B are shown on the display 205. The first video object 309A corresponds to the first source 303A and the second video object 309B corresponds to the second source 303B. The first source 303A is close to the edge of the field of view of the camera 305 so the first video object 309A is displayed close to the edge of the display 205. This means that the first visual object 309 is positioned approximately fifteen degrees from the centre of the display 205. The second source 303B is closer to the centre of the field of view of the camera 305 so the second video object 309B is displayed closer to the centre of the display 205. In the example shown in FIG. 3B the second video object 309B is positioned approximately six degrees from the centre of the display 205.

FIG. 3B also shows the audio sources 307A, 307B as dashed lines. The audio sources 307A, 307B represent the audio source as rendered by the two or more loudspeakers using the spatial metadata determined from the captured microphone signals. The audio sources 307A, 307B are represented as dashed lines in FIG. 3B as they would not be visible to the user 301. The audio sources 307A, 307B would be positioned at locations corresponding to the captured spatial audio signal. In the example of FIG. 3B this means that the first audio source 307A, corresponding to the first source 303A is positioned at an angular position of approximately 38 degrees and the second audio source 307B, corresponding to the second source 303B is positioned at an angular position, closer to the centre of the display 205, of approximately sixteen degrees.

There is therefore a clear discrepancy between the position of the first visual object 309A as displayed on the display 205 and the angular position of the corresponding audio source 307A. This misalignment can clearly be perceived by a user 301 of the rendering device 201. The methods described below may be implemented to mitigate this misalignment.

There is also a discrepancy between the position of the second visual object 309B as displayed on the display 205 and the angular position of the corresponding audio source 307B. However, this discrepancy is not as large as for the first visual object.

Figure 4:
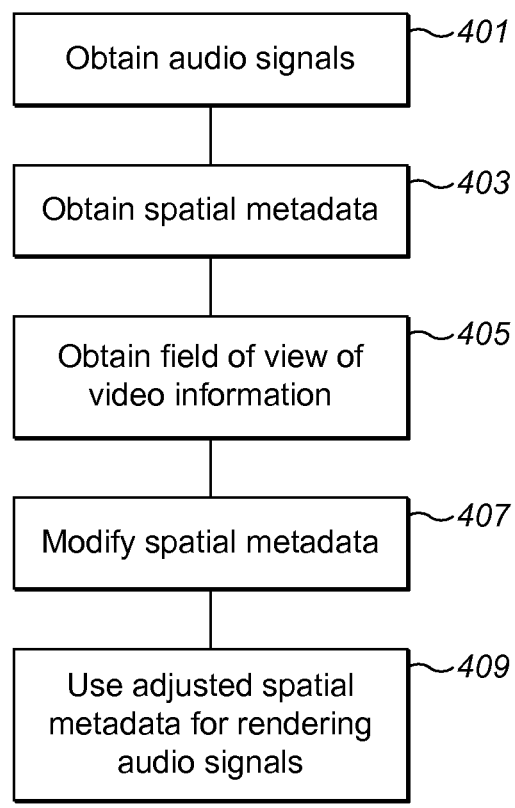
FIG. 4 illustrates an example method.

FIG. 4 illustrates an example method. The example method may be implemented using an apparatus 101 as described above. The apparatus 101 may be provided within a rendering device 201, in such examples the apparatus 101 controls the rendering device 201 to enable the spatial audio to be rendered while video is displayed on the display 205. The method shown in FIG. 4 may enable a spatial audio output signal to be provided so as to mitigate misalignment between the positions of video objects 309 and audio sources 307 such as those shown in FIGS. 3A and 3B.

The method comprises, at block 401, obtaining audio signals 501 comprising one or more channels. In some examples the audio signals 501 may comprise signals that have been captured by a plurality of microphones of the rendering device 201. In some examples the audio signals 501 may been captured by a different recording device and may been transmitted to the rendering device 201 via any suitable communication link. The audio signals 501 may be stored in a memory 107 of the rendering device 201 and may be retrieved from the memory 107 when needed.

The audio signals 501 may comprise one or more channels. The one or more channels may enable spatial audio to be rendered by the rendering device 201.

The method also comprises, at block 403, obtaining spatial metadata 503 relating to the audio signals 501 wherein the spatial metadata 503 comprises information that indicates how to spatially reproduce the audio signals 501. The spatial metadata 503 may comprise information such as the direction of arrival of audio, distances to an audio source, direct-to-total energy ratios, diffuse-to-total energy ratio or any other suitable information. The spatial metadata 503 may be provided in frequency bands. In some examples the spatial metadata 503 may comprise, for one or more frequency sub-bands; a sound direction parameter, and an energy ratio parameter.

In the example shown in FIG. 4 the spatial metadata 503 can be obtained with the audio signals 501. For instance, the rendering device 201 can receive a signal via a communication link where the signal comprises both the audio signals 501 and the spatial metadata 503. In other examples the spatial metadata 503 can be obtained separately to the audio signals. For instance, the apparatus 101 can obtain the audio signals 501 and then can separately process the audio signals 501 to obtain the spatial metadata 503.

In other examples the spatial metadata 503 that is used in the example methods could be processed or have one or more functions applied to it before it is modified to improve alignment of audio sources with video objects. For example, the spatial metadata could be processed to take into account positioning or editing of any video displayed on the display 205. In such examples one or more mapping functions could be applied to the spatial metadata to take into account any zooming, panning or cropping of video displayed on the display 205. It is to be appreciated that other types of processing could be performed on the spatial metadata in other examples of the disclosure. To account for any zooming, panning or cropping of video, the information related to such procedures can also be provided as part of the information related to the field of view 505 so that they can be accounted for to align the spatial audio reproduction with the reproduced video.

At block 405 the method comprises obtaining information 505 relating to a field of view of video. The video is for display on a display 205 of a rendering device 201. The rendering device 201 may comprise two or more loudspeakers 203. The video is associated with the audio signals 501 that were obtained at block 401 in that video objects 309 shown in the video may have associated audio sources which are represented in the audio signals 501.

In some examples the field of view of the video could be the same as the field of view of the camera 305 that was used to capture the video. In other examples the field of view of the video could be different to the field of view of the camera 305, for instance, the video could be processed by cropping or zooming or any other process which could affect the field of view of the video.

In some examples the information 505 related to the field of view of the video could change over time. For example, the video could have a zoom which may change while the video is displayed on the display 205 or which could be manually controlled by the user as the video is displayed.

The information 505 related to the field of view of the video could comprise any information which enables a misalignment between the displayed position of a video object 309 and the position of the corresponding audio source 307 to be identified. In some examples the information 505 relating to the field of view of the video could comprise information relating to the angle of the field of view of the camera 305 that was used to capture the video, the angle of the user's view of the rendering device 201, the amount of zooming in or out of the video as it is displayed on the display 205, any cropping of the video, any panning of the video or any other suitable information.

In some examples the method may also comprise obtaining information 511 about the position of the loudspeakers 203 within the rendering device 201. In some examples the loudspeakers 203 of the rendering device 201 may be in fixed positions within the casing of the rendering device 201. In such examples the information about the position of the loudspeakers 203 may be retrieved from the memory 107 of the rendering device 201. In other examples the positions of the loudspeakers might not be fixed, or may be dependent upon the orientation and/or configuration of the rendering device 201. In such examples one or more sensors may provide information about the positions of the loudspeakers 203 and/or the orientation and/or configuration of the rendering device 201. This information may then be used to determine the positions of the loudspeakers 203.

In some examples the information about the positions of the loudspeakers 203 may be used to determine the types of playback procedure that can be used to render the spatial audio. For instance, in some examples the rendering device 201 may be configured so that a first portion of the audio signals 501 are rendered using a first type of playback procedure and a second portion of the audio signals 501 are rendered using a second, different type of playback procedure. The positions of the loudspeakers may determine the area that is covered by the first region and the second region. The first type of playback procedure may produce spatial audio that is more spatially robust than the second, different type of playback procedure. For example, the first type of playback procedure could comprise amplitude panning and the second type of playback procedure could comprise crosstalk cancellation. In such examples the first portion of audio signals comprises sound directions within a front region of the audio signal and the second portion of audio signals comprises sound directions outside of the front region of the audio signal where front region comprises an area spanned by the loudspeakers 203 of the rendering device 201. It is to be appreciated that other types of playback procedure and other arrangements of the regions could be used in other examples of the disclosure.

At block 407 the method comprises modifying the obtained spatial metadata 503, based on the obtained information 505 relating to a field of view of video. In some examples modifying the obtained spatial metadata 503 can comprise adjusting one or more parameters, such as sound directions, within the spatial metadata 503. The modifying of the spatial metadata 503 enables aligning spatial reproduction of the audio signals with objects in the video. It is to be appreciated that other methods to achieve this aligning could be used in other examples of the disclosure.

At block 409 the method comprises enabling reproduction of the one or more audio signals 501 using the modified spatial metadata or based on other aligning methods. The reproduction may be for the two or more loudspeakers 203 of the rendering device 201.

In some examples the enabling reproduction may comprise using the modified spatial metadata to process the audio signals to provide a spatial audio output signal. The processed spatial audio output signals can then be provided to the two or more loudspeakers 203 for playback.

The modifying of the spatial metadata 503 causes improvement of alignment of directions within a spatial reproduction of the one or more audio signals with objects in the video. In some examples the modification of the spatial metadata 503 causes sound directions near the edge of a field of view of the video to be rendered to a direction corresponding to an edge of the display 205 of the rendering device 201. The modification of the spatial metadata 503 may also cause sound directions that are within the field of view of the video but not near to the edge to be rendered with panning techniques nearer to a centre of the display 205 of the rendering device 201.

In examples where different portions of the audio signals 501 are rendered using different playback procedures the modification of the spatial metadata 503 may change which portion of the audio signals an audio source or other spatial feature falls into and therefore may change the type of playback procedure that is used to render the audio source or other spatial feature. For instance, in the example of FIG. 3A the first audio source 307A may be located at approximately thirty-eight degrees before the spatial metadata 503 is modified. This is outside the area spanned by the loudspeakers 203 and so, if this correction method is not applied, the first audio source 307A would be rendered using a playback technique such as cross talk cancellation. However, if this correction method is applied then the spatial metadata 503 is modified so that the positions of the first audio source 307A are aligned, or moved closer to alignment, with the position of the first video object 309A. In the example shown in FIG. 3A the first audio source 307A would now be located at approximately fifteen degrees. This is inside the area spanned by the loudspeakers 203 and so, if the correction method is applied, the first audio source 307A would be rendered using a more spatially robust playback procedure such as amplitude panning. This therefore reduces the misalignment between the audio source 307A and the video object 309A and provides a better spatial audio experience for the user 301.

Figure 5:
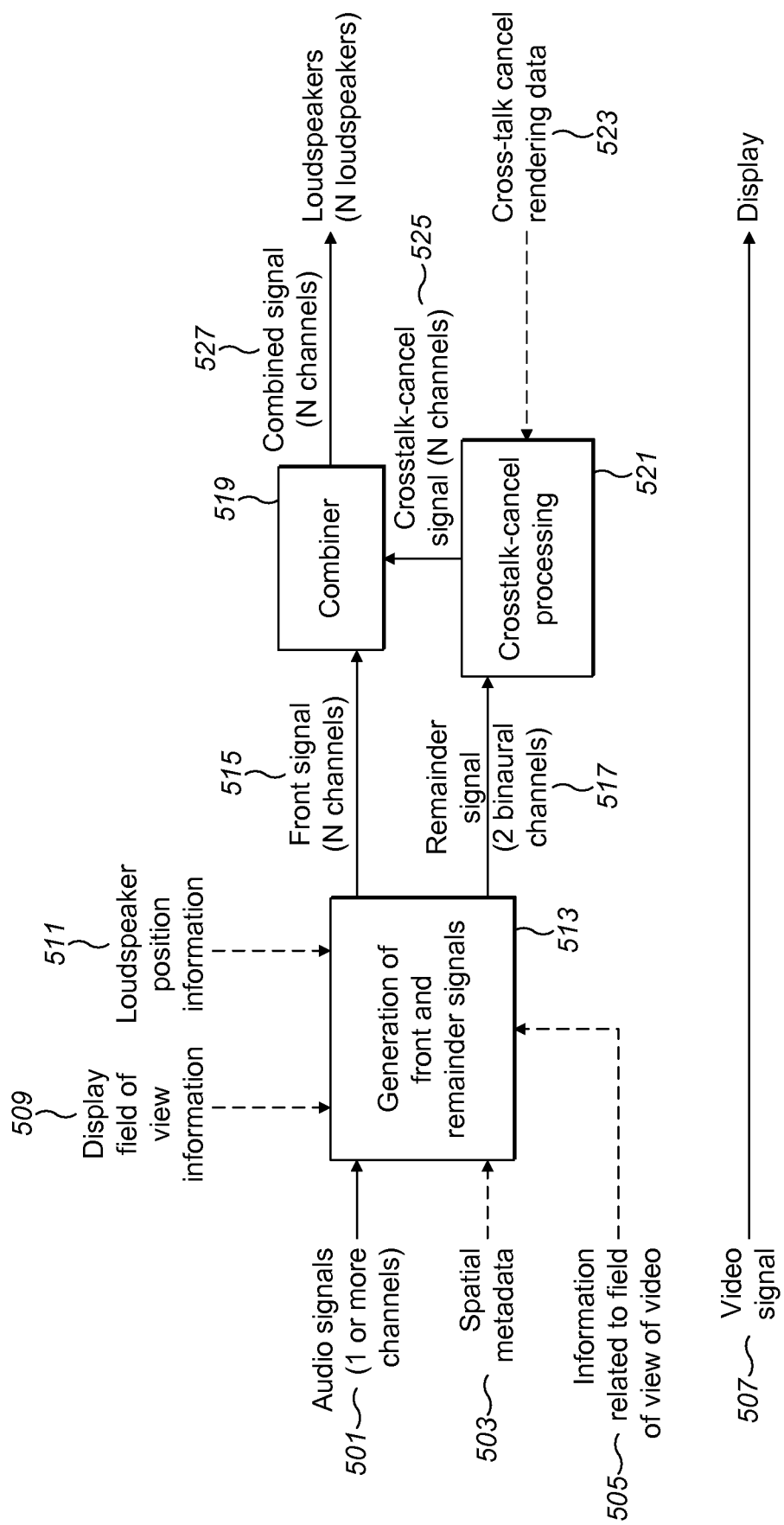
FIG. 5 illustrates an example method.

FIG. 5 illustrates an example method in more detail. The method may be implemented using apparatus 101 and rendering devices 201 as described above.

In the example method of FIG. 5 a plurality of different types of information are obtained. In the example of FIG. 5 the apparatus obtains audio signals 501 where the audio signals comprise one or more channels, spatial metadata 503 where the spatial metadata comprises information which enables spatial reproduction of the audio signals 501, information 505 relating to the field of view of video and a video signal 507. The video signal 507 may be associated with the audio signal 501 so that the audio signal provides audio to accompany the video signal 507.

In some examples the information 505 relating to the field of view of video could comprise an angle value determining the field of view of the camera 305 which captured the video signal. The angle could be in the horizontal plane. In other examples the information 505 relating to the field of view of video may also provide angular information relating to an elevation of the camera 305. In other examples the information 505 relating to the field of view of video may comprise information defining a shape of the field of view. In some examples the information 505 relating to the field of view of video may comprise information relating to any zooming or cropping of the video as it is displayed on a display 205.

The different types of information 501, 503, 505, 507 may be obtained from one or more sources. In some examples the different types of information 501, 503, 505, 507 may be obtained from a separate capturing device that may have captured the audio signals 501 and the video signals 507 and determined the spatial metadata 503 and the information 505 relating to the field of view of video. The capturing device could be a mobile phone capturing audio with the microphones and video with the camera or any other suitable type of device.

The capturing device can use any suitable method to determine the spatial metadata 503. The spatial metadata 503 may be determined by performing correlation analysis between microphone pairs at different delays and determining based on this analysis directions of arriving sound and energy ratios for different frequency sub-bands. In some examples the spatial metadata 503 could be obtained using spatial audio capture (SPAC) or any other suitable method.

The capturing device may encode the different types of information 501, 503, 505, 507 to a media stream that is then transmitted to the rendering device 201. Different types of encoding could be used for the different types of information 501, 503, 505, 507. For instance, the audio signals 501 could be encoded using EVS (enhanced voice services) or AAC (advanced audio coding) coding or any other suitable procedure.

The spatial metadata 503 could be encoded and embedded within the encoded audio signals. Any suitable encoding procedure could be used to encode the video signal 507 and the information 505 relating to the field of view of video. The capturing device may multiplex the encoded audio signal and the encoded video signal and the other information 503, 505 to provide a single media stream. The single media stream can then be received by the rendering device 201. The rendering device 201 may then decode and demultiplex the received signals to obtain the different types of information 501, 503, 505, 507 as shown in FIG. 5.

In other examples the rendering device 201 which is performing the method of FIG. 5 could also be capturing the audio signals 501 and the video signals 507. Where the rendering device 201 is also the capturing device the rendering device 201 may perform the capturing and encoding of the different types of information 501, 503, 505, 507 as described above. In this example, the encoded media signals are not necessarily transmitted but may be played back with the same rendering device 201. For instance, the encoded media signals may be stored in a memory 107 and retrieved when the user 301 views the previously captured videos. When the different types of information 501, 503, 505, 507 are retrieved from the memory 107 for reproduction then the method shown in FIG. 5 may be applied.

In some examples the video signal 507 may be displayed on the display 205 without any pre-processing while in other examples some pre-processing could be applied. The pre-processing could affect the information 505 relating to the field of view of video. For example, if the video is cropped this could change the width of the angles of the field of view. In such examples the information 505 relating to the field of view of video would be modified to take the pre-processing of the video signal 507 into account.

In the example of FIG. 5 the apparatus 101 also receives display field of view information 509 and loudspeaker position information 511.

The display field of view information 509 may provide information about the user's view angle when they are using the rendering device 201. The display field of view information 509 may be determined by the dimensions of the display 205 within the rendering device 201 assuming a typical viewing distance. Therefore, this information could be stored in the rendering device 201 and retrieved as needed.

The loudspeaker position information 511 may also be determined by the dimensions of the rendering device 201. The loudspeakers 203 may have fixed positions within the rendering device 201 so the loudspeaker position information 511 can be stored in the rendering device 201 and retrieved as needed. In some examples the rendering device 201 could be configured so that the positions of the loudspeakers 203 could change. For example, the rendering device 201 could comprise a foldable device. In such examples information about the folding or other configuration of the rendering device 201 is used to determine the loudspeaker position information 511.

The audio signals 501, spatial metadata 503, information 505 relating to the field of view of video, information related to display field of view 509 and loudspeaker position information 511 are provided to a signal generator module so that, at block 513, different signals are generated to cover different regions of the audio space covered by the audio signals. In the example of FIG. 5 the signal generator module generates a front signal and a remainder signal. The front signal covers the region of the audio space which is covered by the loudspeakers of the rendering device 201. The remainder signal covers the rest of the audio space. The region of the audio space which is covered by the loudspeakers will depend upon the positions of the plurality of loudspeakers within the rendering device 201.

Figure 6:
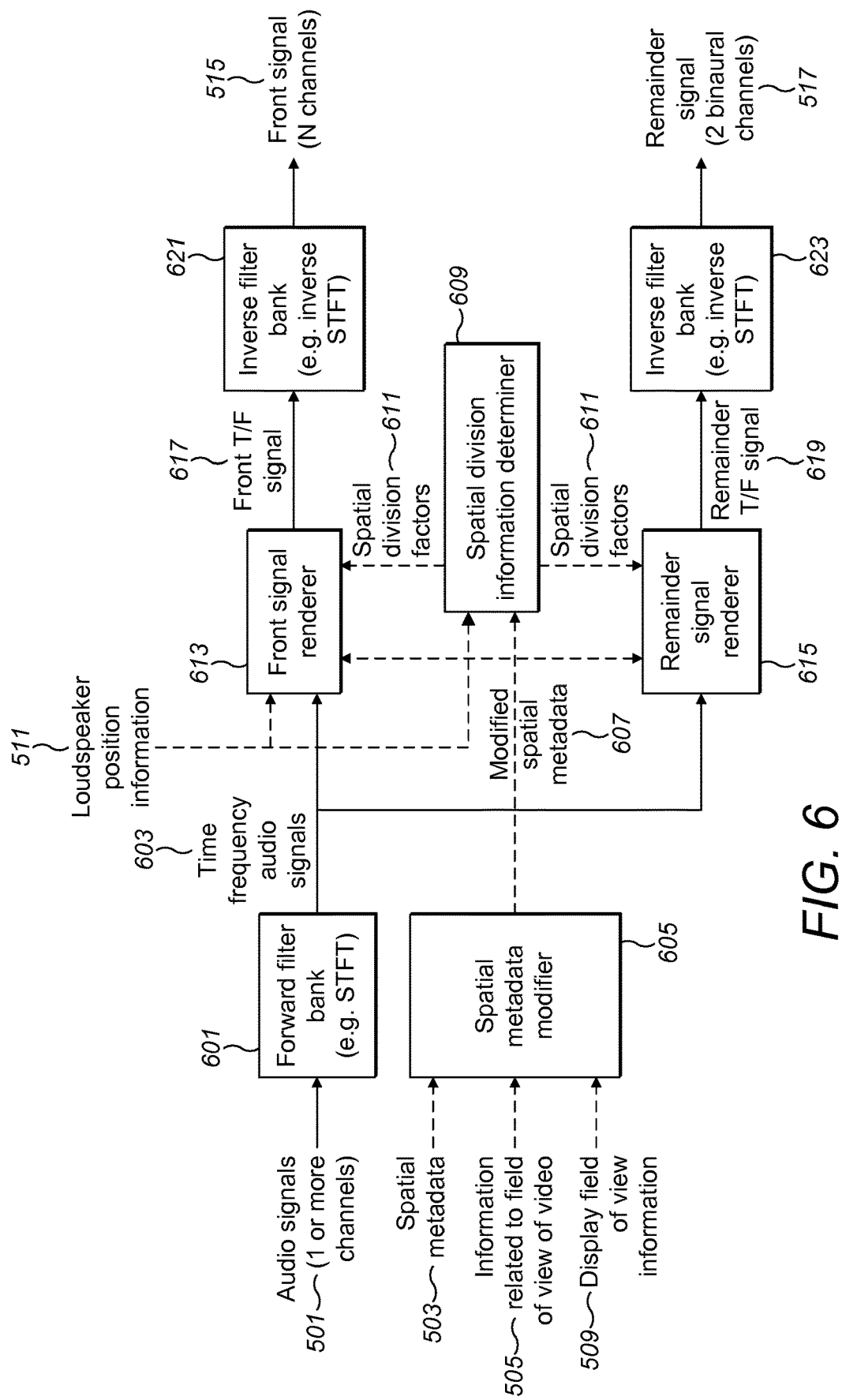
FIG. 6 illustrates an example method.

At block 513 the spatial metadata 503 may be modified to improve alignment of the audio sources with the video objects. FIG. 6 shows an example method which may be performed by the signal generator module so as to reduce misalignment of the audio sources within the audio signals 501 and the objects in the video signals 507.

In the example shown in FIG. 6 the audio signals 501 are provided to a filter bank module 601. The filter bank module 601 may be configured to filter the audio signals 501. In some examples the filter bank module 601 may be configured to transform the audio signals 501 to a time-frequency representation. The filter bank module 601 may be configured to apply any suitable transform of the time domain signal to a time-frequency signal. Suitable transforms include the short-time Fourier transform (STFT) and the complex-modulated quadrature mirror filter (QMF) bank or any other similar transform. In the example of FIG. 6 the filter bank module 601 comprises a forward filter bank. The output of the filter bank module 601 is a time frequency signal 603.

The spatial metadata 503, information 505 relating to the field of view of video, and the display field of view information 509 are provided to a spatial metadata modifier module 605. The spatial metadata modifier module 605 is configured to match the directions of the audio signals 501 described by the spatial metadata to the directions of video objects in the video signals 507 so as to reduce misalignment of the audio sources with the video objects.

FIGS. 7A and 7B schematically illustrate how the spatial metadata 503 may be modified. FIGS. 7A and 7B show direction values within the spatial metadata 503 before modifications and the corresponding directions after the spatial metadata 503 has been modified.

In the example of FIG. 7A the field of view of the video is wider than the display field of view. This circumstance could arise as shown in FIGS. 3A and 3B where the field of view of the camera 305 that captured the video has a wider field of view than the display 205 at a typical or assumed viewing distance. In this example directions in the spatial metadata 503 are generally moved to a narrower angle.

In the example of FIG. 7B the field of view of the video is narrower than the display field of view. This circumstance could arise if the video has been zoomed or cropped before it is displayed on the display 205. In this example directions in the spatial metadata 503 are generally moved to a wider angle.

The method used to modify the spatial metadata 503 as shown in FIGS. 7A and 7B is described below. This method could be performed by the spatial metadata modifier module 605 as shown in FIG. 6.

The directions of the spatial metadata 503 are denoted azimuth $\theta(k, n)$ and elevation $\varphi(k, n)$, where k is a frequency band index where the spatial metadata 503 is defined, and n is a time index. The field of view of the video is determined by an azimuth value $\theta_{video}$ and an elevation value $\varphi_{video}$ video which are offset values from center so that the overall field of view of the video in a horizontal direction is $2\theta_{video}$. The display field of view at a typical or assumed viewing distance is determined in corresponding parameters $\theta_{disp}$ and $\varphi_{disp}$. In this example it is assumed that the aspect ratio of the video has been matched to the aspect ratio of the display 205. In other examples the processing methods may be adapted to take into account differences in the aspect ratio of the video and the display 205. In this example it is assumed that the video field of view is centred. In other examples the video field of view may not be centred, for example, when the user has selected a playback-stage zooming to a non-centre position of the video.

The spatial metadata modifier module 605 categorizes the directions of the spatial metadata 503 into three different regions:

Region 1: the direction corresponds to a direction within the field of view of the video, this situation is when $|\theta(k, n)| \leq \theta_{video}$ and $|\varphi(k, n)| \leq \varphi_{video}$;

Region 2: the direction corresponds to a direction outside of the field of view of the video but where the azimuthal angle is between −90 and 90 degrees;

Region 3: the direction corresponds to a direction outside of the field of view of the video but where the azimuthal angle is outside −90 and 90 degrees, that is, at the rear half sphere.

In this example the method that is used to modify the directions of the spatial metadata 503 will depend upon which of the regions the direction can be categorized into.

When the direction of the spatial metadata 503 is categorized into region 1 then method 1 is used to modify the spatial metadata 503.

Method 1: method 1 comprises scaling the sound directions corresponding to the field of view of the video to match to the field of view of the display by:

$$\theta'(k, n) = \theta(k, n) \frac{\theta_{disp}}{\theta_{video}}$$

$$\varphi'(k, n) = \varphi(k, n) \frac{\varphi_{disp}}{\varphi_{video}}$$

When the direction of the spatial metadata 503 is categorized into region 2 then method 2 is used to modify the spatial metadata 503. Region 2 covers the region outside of the field of view of the video but inside the front half sphere of the audio space.

Method 2: method 2 comprises matching the metadata modification at the boundaries of the different regions. In this example it comprises matching the scaling of method 1 at the edges of the field of view of the video and matching to no modification as the angle approaches ±90 degrees for the azimuth and/or elevation.

In method 2 the nearest point of edge of the field of view of the video to the direction parameter is determined:

$$\hat{\theta}(k, n) = \text{sign}(\theta(k, n))\min(|\theta(k, n)|, \theta_{video})$$

$$\hat{\varphi}(k, n) = \text{sign}(\varphi(k, n))\min(|\varphi(k, n)|, \varphi_{video})$$

Once the nearest point of edge of the field of view of the video has been determined two distance values are formulated. The first distance value $d_1(k,n)$ is between the direction parameter and the nearest point computed above. The second distance value $d_2(k, n)$ is between the direction parameter and the nearest edge region 2 (i.e., ±90 degrees azimuth or elevation).

$$d_1(k, n) = \sqrt{(\theta(k,n) - \hat{\theta}(k,n))^2 + (\varphi(k,n) - \hat{\varphi}(k,n))^2}$$

$$d_2(k, n) = \min(90 - |\theta(k, n)|, 90 - |\varphi(k, n)|)$$

Then, in method 2, the modified direction values are $$\theta'(k, n) = \theta(k, n) + \hat{\theta}(k, n)\left(\frac{\theta_{disp}}{\theta_{video}} - 1\right)\frac{d_2(k, n)}{d_1(k, n) + d_2(k, n)}$$

$$\varphi'(k, n) = \varphi(k, n) + \hat{\varphi}(k, n)\left(\frac{\varphi_{disp}}{\varphi_{video}} - 1\right)\frac{d_2(k, n)}{d_1(k, n) + d_2(k, n)}$$

When the direction of the spatial metadata 503 is categorized into region 3 then no modification of the spatial metadata 503 is performed so that for region 3:

$$\theta'(k, n) = \theta(k, n)$$

$$\varphi'(k, n) = \varphi(k, n)$$

The methods described above result in the modified spatial metadata 607 which is shown schematically in FIGS. 7A and 7B. The modified spatial metadata 607 is provided as the output of the spatial metadata modifier module 605 as shown in FIG. 6. The modified spatial metadata 607 comprises the modified direction values θ'(k, n) and φ'(k,n) and any other spatial metadata other than the direction values that has not been modified. In some examples the other spatial metadata could also be modified.

It is to be appreciated that other methods for modifying the spatial metadata 503 could be used in other examples of the disclosure. For instance, in some examples the loudspeakers 203 of the rendering device 201 could be located within a horizontal plane. For instance, in the rendering device 201A shown in FIG. 2A the two loudspeakers 203 are provided in a single horizontal plane. In this example, the azimuth and elevation values may be mapped to only azimuth values before the spatial metadata 503 is modified.

As an example, the mapping may be performed by setting the elevation value φ(k, n) to zero before the above described methods of modifying the spatial metadata 503 are applied. In another example, the following method could be employed. This method maps any direction to a horizontal azimuth corresponding to the same cone of confusion of human hearing $$y(k, n) = \sin(\theta(k, n))\cos(\varphi(k, n))$$

$$x(k, n) = \sqrt{1 - (y(k,n))^2}$$

$$\theta_{horiz}(k, n) = a\tan2(y(k, n), x(k, n))$$

Then, in this method, the azimuth value θ(k, n) may be set to $\theta_{horiz}(k,n)$ and φ(k, n) as zero before the above described methods of modifying the spatial metadata 503 are applied.

Returning to FIG. 6 the modified spatial metadata 607 is provided to a spatial division information determiner module 609. The spatial division information determiner module 609 is configured to determine whether the sound directions of the audio signals, as defined by the modified spatial metadata 607, fall within a first portion of the audio signals or a second portion of the audio signals. In this example the first portion of the audio signals comprises sound directions within a front region of the audio signal and the second portion of audio signals comprises sound directions outside of the front region of the audio signal and non-directional or ambient sounds.

The spatial division information determiner module 609 obtained both the modified spatial metadata 607 and the loudspeaker position information 511 and uses these to determine which portion of the audio signals a sound direction falls into.

In an example rendering device 201B comprising three or more loudspeakers 203 that are not in the same horizontal plane then the following method could be applied. The rendering device 201B could be as shown in FIG. 2B. In this example the method described above, in which the directions of the spatial metadata 503 are not mapped to the horizontal plane, is used by the spatial metadata modifier 605 to obtain the modified directions θ'(k, n) and φ'(k, n). The spatial division information determiner module 609 may then determine if the modified directions θ'(k, n) and φ'(k, n) are within the area spanned by the loudspeakers 203. If the modified directions are within the area spanned by the loudspeakers 203 then the spatial division information determiner module 609 determines a spatial division factor f(k, n)=1. If the modified directions are not within the area spanned by the loudspeakers 203 then the spatial division information determiner module 609 determines a spatial division factor f(k, n)=0.

In an example rendering device 201A comprising loudspeakers 203 that are in the same horizontal plane then the following method could be applied. The rendering device 201A could be as shown in FIG. 2A. In this example the method described above, in which the directions of the spatial metadata 503 are mapped to the horizontal plane, is used by the spatial metadata modifier 605 to obtain the modified directions θ'(k, n) and φ'(k, n). The spatial division information determiner module 609 may then determine if the modified azimuth values θ'(k, n) are within the arc spanned by the loudspeakers 203. If the modified azimuth values are within the arc spanned by the loudspeakers 203 then the spatial division information determiner module 609 determines a division factor f(k, n)=1. If the modified azimuth values are not within the arc spanned by the loudspeakers 203 then the spatial division information determiner module 609 determines a spatial division factor f(k,n)=0. In these examples, the factor f(k, n) is determined for each spatial metadata direction θ(k,n), φ(k, n).

In some examples the spatial division factors determined by the spatial division information determiner module 609 may be spatially smoothed so as to avoid hard spatial transition points. For example, where the loudspeakers 203 are arranged in the same horizontal plane at an angle of $\pm\theta_{LS}$, the following function may be determined that provides a smooth transition to the spatial division factor f(k,n).

$$f(k, n) = 1 - \max\left(0, \min\left(1, (|\theta(k, n)| - 0.75\theta_{LS})\frac{2}{\theta_{LS}}\right)\right)$$

The spatial division factors 611 that are output by the spatial division information determiner module 609 are then provided to the front signal renderer module 613 and the remainder signal renderer module 615. The front signal renderer module 613 enables a first type of playback procedure to be used to render audio signals that fall within the front region and the remainder signal renderer module 615 enables a second, different type of playback procedure to be used to render audio signals that fall within the remainder region.

The front signal renderer module 613 obtains the time-frequency audio signals 603, the spatial division factors 611, the modified spatial metadata 607 and the loudspeaker position information 511. The front signal renderer module 613 uses this obtained information to process a front amplitude panned sound.

In order to process the front amplitude panned sound the following method could be followed. The method could be followed for different frequency bands of the audio signals. The method comprises:

1) Measuring a covariance matrix $C_{in}(k, n)$ of the time-frequency audio signals.
2) Determining a target overall energy, which is the sum of diagonal elements of the covariance matrix $C_{in}(k, n)$. This overall energy is denoted $E(k,n)$.
3) Determining a target covariance matrix based on the target overall energy, the loudspeaker position information 511, and the modified spatial metadata 607 and spatial division factors 611. In this example the modified spatial metadata 607 comprises the modified direction parameters $\theta'(k, n)$ and $\varphi'(k, n)$, and also a direct-to-total energy ratio $r(k,n)$. The steps to determine the target covariance matrix could comprise the following:
   a. Determining a panning gain column vector $g(\theta'(k,n), \varphi'(k,n))$, for example, using the known vector-base amplitude panning (VBAP) for the arrangement of loudspeakers 203 within the rendering device 201. The loudspeaker position information 511 could be used to determine the panning gain column vector $g(\theta'(k, n), \varphi'(k, n))$. If a direction parameter is outside of the directions spanned by the loudspeakers 203 within the rendering device 201, then the nearest direction of the directions spanned by the loudspeakers 203 within the rendering device 201 may be used in determining the panning gain vector. The panning gain vector has as many elements as there are loudspeakers 203 within the rendering device 201.
   b. Determining the front target covariance matrix as $$C_f(k, n) = g(\theta'(k, n), \varphi'(k, n))g^H(\theta'(k, n), \varphi'(k, n))r(k, n)f(k, n)E(k, n)$$

4) Determining a prototype matrix Q that maps the input audio channels to the processed loudspeaker channels in a reasonable way. For example, in the rendering device 201B shown in FIG. 2B the loudspeaker channels are in order, 1. top, 2. left and 3. right. If the input channels are stereo (left and right) audio channels, then the prototype matrix could be $$Q = \begin{bmatrix} 0.5 & 1 & 0 \\ 0.5 & 0 & 1 \end{bmatrix}^T$$

5) Determining a mixing matrix based on $C_{in}(k,n)$, $C_f(k,n)$ and Q, and processing the frequency band of the audio signal 501 with the mixing matrix to generate the processed front frequency band signal. The processing is performed for each frequency band independently.

The front signal renderer module 613 therefore outputs a front time-frequency signal 617.

The remainder signal renderer module 615 also obtains the time-frequency audio signals 603, the spatial division factors 611, the modified spatial metadata 607. The remainder signal renderer module 615 uses this obtained information to process binaural two-channel time-frequency signal. The method followed by the remainder signal renderer module 615 could be similar to the method followed by the front signal renderer module 613 except that it is configured to provide an output of a binaural two-channel time-frequency signal instead of the front panned sound.

The method of the remainder signal renderer module 615 differs from the method of the front signal renderer module 613 in that:

The target covariance matrix uses head-related transfer functions (HRTFs) $h(k, \theta'(k,n), \varphi'(k, n))$ and binaural diffuse field covariance matrix $C_{diff}(k)$, which can be formulated by determining a spatially evenly distributed set directions $\theta_d$, $\varphi_d$, where $d=1, \ldots, D$ and $$C_{diff}(k) = \frac{1}{D}\sum_{d=1}^{D} h(k, \theta_d, \varphi_d)h^H(k, \theta_d, \varphi_d)$$

The remainder target covariance matrix is then $$C_r(k,n) = h(k, \theta'(k, n), \varphi'(k,n))h^H(k, \theta'(k,n), (\varphi'(k, n))r(k,n)(1-f(k,n))E(k, n)+(1-r(k, n))C_{diff}(k)E(k, n)$$

The prototype matrix Q for the remainder signal renderer module 615 then maps the input channels to left and right (binaural) output channels. If the input channels are stereo (left and right) channels, then Q is an identity matrix, with potentially some small regularization terms at the off-diagonal elements.

The remainder time-frequency signal is generated using a mixing matrix and the time-frequency audio signals 603. The remainder signal renderer module 615 therefore outputs a remainder time-frequency signal 619.

In this example both the front signal renderer module 613 and the remainder signal renderer module 615 use estimation of input covariance matrices and overall target energies. It is to be appreciated that these estimations do not need to be independent of each other but could be shared between the respective signal renderer modules 613, 615.

The front time-frequency signal 617 is provided to an inverse filter bank 621 and the remainder time-frequency signal 619 is also provided to an inverse filter bank 623. The inverse filter banks 621, 623 use an inverse of the transform used by the Forward filter bank 601. For example, the inverse filter banks 621, 623 could use an inverse STFT or an inverse complex-modulated quadrature mirror filter bank or any other suitable type of inverse filter bank.

The first inverse filter bank 621 provides a front signal 515 as an output and the second inverse filter bank 623 provides a second signal 517 as an output. These are the outputs of block 513 as shown in FIG. 5. The front signal 515 has N channels where N is the number of loudspeakers 203 of the rendering device 201. The remainder signal 517 comprises 2 binaural channels.

Returning to FIG. 5 the front signal 515 is provided to a combiner module 519 and the remainder signal 517 is provided to a cross-talk cancel processing block 521.

The cross-talk cancel processing block 521 obtains the remainder signal 517 and also cross-talk cancel rendering data 523. The cross-talk cancel processing block 521 is configured to use the obtained remainder signal 517 and cross-talk cancel rendering data 523 to perform cross-talk cancel processing. The cross-talk cancel processing is configured to receive two channels and reproduce those two channels so that, after reproduction over the loudspeakers 203 and propagation through the air to the user's ears, the channels are as authentic as possible at the positions of the user's ear canals. The cross-talk cancel processing controls the acoustic cancellation and superimposition so that the left binaural signal is conveyed as well as possible to the user's left ear, and the right binaural signal is conveyed as well as possible to the user's right ear.

The cross-talk cancel processing block 521 provides cross-talk cancel signal 525 as an output. The cross-talk cancel signal 525 comprises N channels where N is the number of loudspeakers 203 of the rendering device 201 being used to reproduce the audio signals.

The cross-talk cancel signal 525 is provided to the combiner module 519.

The combiner module 519 uses the cross-talk cancel signal 525 and the front signal 515 and combines them. In some examples the cross-talk cancel signal 525 and the front signal 515 could be combined by adding them together. In some examples the combiner module 519 could also provide additional processing to the combined signals. For example, the combiner module 519 could be configured to apply limiter processing to avoid clipping of the combined signal or any other suitable type of processing.

The combiner module 519 provides a combined signal 527 as an output. The combined signal comprises N channels where N is the number of loudspeakers 203 of the rendering device 201. The combined signal is then reproduced by the loudspeakers 203 of the rendering device 201.

It is to be appreciated that variations can be made to the examples described above. For instance, in these examples it is assumed that the video has been centred in a single direction whereas in other examples the video could change the main direction. In such examples the modification of the spatial metadata may take this change in direction into account.

In other examples, the processing need not involve cross-talk cancelling processing or could omit cross-talk cancel processing at some frequency ranges. For instance, in some examples the sounds outside of the front region could be reproduced as sounds within the front region. In such examples, for instance, a sound located at 90 degrees to the left could be reproduced with the left loudspeaker 203 of the rendering device 201 which means the sound is not reproduced as a virtual source at 90 degrees but as a point source within the left loudspeaker. Similarly, for at one or more frequency ranges, the ambience may be reproduced as incoherent sound at the loudspeakers 203 instead of using any cross-talk canceling related processing.

The above described examples therefore provide apparatus and methods to spatially faithfully reproduce spatialised sound using loudspeakers 203 of a rendering device 201 such as a mobile phone or tablet computer even though the loudspeakers 203 of such rendering devices 201 are not surrounding the user. In some of the examples the sounds of a front region may be reproduced using amplitude panning which provides good quality timbre and accurate spatial perception. The front region may comprise the sounds that are most relevant to the user of the rendering device 201.

The sounds of the area outside of the front region can be reproduced by a different playback procedure. In some examples the sounds of the area outside of the front region can be reproduced using cross-talk cancelled binaural reproduction, which may be spatially less robust than the amplitude panning but still provides spatialization. The spatialization of the sounds is performed in a way that the audio sources are perceived at their correct directions when compared to image sources in the video displayed by the rendering device 201.

The blocks illustrated in FIGS. 4 to 6 may represent steps in a method and/or sections of code in the computer program 109. The illustration of a particular order to the blocks does not necessarily imply that there is a required or preferred order for the blocks and the order and arrangement of the block may be varied. For example, cross-talk cancel processing can be performed on signals in the time-frequency domain and so the inverse transform could be performed after the cross-talk cancel processing. Furthermore, it may be possible for some blocks to be omitted and/or combined. For instance, the front signal renderer module 613, the remainder signal renderer module 615, the cross-talk cancel processing block 521 and the combiner module 519 could be combined into a single block or module where the front and remainder signals are rendered at the same time.

The methods shown in FIGS. 4 to 6 and described above enable aligning the reproduction of spatial audio signal to the reproduced video based on the information related to the field of view. In these examples the alignment is achieved by modifying the direction parameters within spatial metadata. It is appreciated that other methods can be used to achieve such alignments in other examples of the disclosure. In some of these examples the spatial metadata does not need to be modified. For instance, spatial transformation or another similar process could be used instead of modifying the spatial metadata.

In the foregoing examples, the front signal renderer 613 performs amplitude panning based on the parameters at the modified spatial metadata 607. In other examples, if the spatial metadata 503 is not modified, the front signal renderer 613 may receive the unmodified spatial metadata, or spatial metadata modified other than based on the information related to the field of view. In such examples, the information related to the field of view is also provided to the front signal renderer 613 and it performs the spatial transformations accordingly. For example, when determining panning gains for an angle α the front signal renderer may use a mapping function β=m(α), and determine the panning gains for the mapped position β=m(α). The mapping function m( ) could be configured based on the information related to the field of view to achieve similar spatial mapping as occurs in the prior examples at spatial metadata modifier 605, and as shown in FIGS. 7A and 7B. Similarly, any other block or functionality that was shown to rely on modified spatial metadata based on the information related to field of view may use, in that respect, unmodified spatial metadata, and perform internally the required spatial mappings, based on the information related to the field of view.

Therefore, in audio processing systems such as those shown in FIGS. 4 to 6 aligning the reproduction of spatial audio signal to the reproduced video based on the information related to the field of view can be performed by various different processing entities within the system. When reproducing a spatial audio signal consisting of audio signal(s) and spatial metadata, a person skilled in the art may implement the procedure of modifying (or mapping or altering) the spatial reproducing based on the information related to the field of view by modifying the spatial metadata, and also by other means such as spatial transformation.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to 'comprising only one . . . ' or by using 'consisting'.

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims. For instance, the examples described above can be used for other types of output other than for loudspeaker playback. For example, the modified spatial metadata 503 may be used also for rendering a binaural output for headphones. As the result, the spatial matching of audio and video is improved also for headphone binaural playback. In headphone rendering, using head orientation tracking at the rendering provides an option to optimally match the audio and video reproduction.

Features described in the preceding description may be used in combinations other than the combinations explicitly described above.

Explicitly indicate that features from different examples (e.g. different methods with different flow charts) can be combined, to Although functions have been described with reference to certain features, those functions may be performable by other features whether described or not.

Although features have been described with reference to certain examples, those features may also be present in other examples whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer any exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

We claim:

1. An apparatus comprising:
    at least one processor; and
    at least one memory including computer program code;
        the at least one memory and the computer program code configured to, with the at least one processor, cause the apparatus at least to:
    obtain audio signals comprising one or more channels;
    obtain spatial metadata associated with the audio signals, wherein the spatial metadata comprises information that indicates how to spatially reproduce the audio signals;
    obtain information relating to a field of view of video, wherein the video is for display on a display of a rendering device and wherein the video is associated with the audio signals;
    generate spatially aligned audio signals by aligning a spatial reproduction of the audio signals with objects in the video based on the obtained spatial metadata and the obtained information relating to the field of view of the video, wherein, prior to the aligning, the spatial reproduction of the audio signals and the objects in the video are misaligned, and wherein generating the spatially aligned audio signals comprises modifying the spatial metadata by adjusting one or more parameters within the spatial metadata; and
    reproducing the spatially aligned audio signals from two or more loudspeakers based on the aligning.

2. An apparatus as claimed in claim 1, wherein generating the spatially aligned audio signals comprises processing a spatial audio output signal based, at least in part, on the obtained audio signals and the obtained spatial metadata, wherein the processing is configured to use the obtained information relating to the field of view of video to align one or more spatial features of the output spatial audio signal with corresponding visual objects in the video.

3. An apparatus as claimed in claim 1, wherein adjusting the one or more parameters within the spatial metadata is performed based on the obtained information relating to a field of view of video.

4. An apparatus as claimed in claim 1, wherein the rendering device comprises the two or more loudspeakers and the reproduction of the spatially aligned audio signals is by the two or more loudspeakers of the rendering device.

5. An apparatus as claimed in claim 1,
wherein reproducing the spatially aligned audio signals comprises:
reproducing a first portion of the spatially aligned audio signals using a first type of playback procedure and reproducing a second portion of the spatially aligned audio signals using a second type of playback procedure, different from the first type,
and wherein the generating the spatially aligned audio signals comprises:
determining, at least in part, whether a spatial feature of the audio signal falls within the first portion or the second portion.

6. An apparatus as claimed in claim 5, wherein the first type of playback procedure comprises amplitude panning.

7. An apparatus as claimed in claim 5, wherein the second type of playback procedure comprises crosstalk cancellation.

8. An apparatus as claimed in claim 5, wherein the first portion of the spatially aligned audio signals comprises sound directions within a front region of the audio signal and the second portion of the spatially aligned audio signals comprises sound directions outside of the front region of the audio signal.

9. An apparatus as claimed in claim 8, wherein the front region comprises an area spanned by the two or more loudspeakers of the rendering device.

10. An apparatus as claimed in claim 8, is further caused to obtain information relating to the positions of the two or more loudspeakers within the rendering device and use the information relating to the positions of two or more loudspeakers of the rendering device to determine boundaries of the front region and outside of the front region.

11. An apparatus as claimed in claim 1, wherein the reproduction of the spatially aligned audio signals with objects in the video causes sound directions near an edge of a field of view of the video to be reproduced to a direction corresponding to an edge of a display of the rendering device and sound directions that are within the field of view of the video but not near an edge of a field of view of the video to be reproduced with panning techniques nearer to a center of the display of the rendering device.

12. An apparatus as claimed in claim 1, wherein the spatial metadata further comprises, for one or more frequency sub-bands;
a sound direction parameter, and
an energy ratio parameter.

13. An apparatus as claimed in claim 1, wherein at least one of the audio signals or video signals representing the video are captured by the rendering device or a capturing device, separate from the rendering device, wherein, responsive to the at least one of the audio signals or video signals being captured by the capturing device, the at least one of the audio signals or video signals are transmitted to the rendering device.

14. An apparatus as claimed in claim 13, wherein at least one of the spatial metadata and information relating to a field of view of video is transmitted to the rendering device from the capturing device.

15. An apparatus as claimed in claim 1, wherein the spatially aligned audio signals are reproduced within an audio space from two or more loudspeakers of the rendering device based on the aligning, and wherein the spatially aligned audio signals comprise (i) a first portion of audio signals associated with a region of the audio space covered by the loudspeakers of the rendering device and (ii) a second portion associated with a remainder of the audio space outside of the region.

16. A method comprising:
obtaining audio signals comprising one or more channels;
obtaining spatial metadata associated with the audio signals wherein the spatial metadata comprises information that indicates how to spatially reproduce the audio signals;
obtaining information relating to a field of view of video wherein the video is for display on a display of a rendering device and wherein the video is associated with the audio signals;
generating spatially aligned audio signals by aligning a spatial reproduction of the audio signals objects in the video based on the obtained spatial metadata and the obtained information relating to the field of view of the video, wherein, prior to the aligning, the spatial reproduction of the audio signals and the objects in the video are misaligned, and wherein generating the spatially aligned audio signals comprises modifying the spatial metadata by adjusting one or more parameters within the spatial metadata; and
reproducing the spatially aligned audio signals from two or more loudspeakers based on the aligning.

17. A method as claimed in claim 16, wherein reproducing the spatially aligned audio signals comprises processing a spatial audio output signal based, at least in part, on the obtained audio signals and the obtained spatial metadata, wherein the processing is configured to use the obtained information relating to the field of view of video to align one or more spatial features of the output spatial audio signal with corresponding objects in the video.

18. A method as claimed in claim 16, wherein adjusting the one or more parameters within the spatial metadata is performed based on the obtained information relating to a field of view of video.

19. A method as claimed in claim 18,
wherein reproducing the spatially aligned audio signals comprises:
reproducing a first portion of the spatially aligned audio signals using a first type of playback procedure and reproducing a second portion of the spatially aligned audio signals using a second different type of playback procedure,
and wherein generating the spatially aligned audio signals comprises:
determining, at least in part, whether a spatial feature of the audio signal falls within the first portion or the second portion.

20. A non-transitory computer-readable storage medium storing a computer program, the computer program comprising computer program instructions that, when executed by processing circuitry, cause:
obtaining audio signals comprising one or more channels;
obtaining spatial metadata associated with the audio signals wherein the spatial metadata comprises information that indicates how to spatially reproduce the audio signals;
obtaining information relating to a field of view of video wherein the video is for display on a display of a rendering device and wherein the video is associated with the audio signals;
generating spatially aligned audio signals by aligning a spatial reproduction of the audio signals with objects in the video based on the obtained spatial metadata and the obtained information relating to the field of view of the video, wherein, prior to the aligning, the spatial reproduction of the audio signals and the objects in the video are misaligned, and wherein generating the spatially aligned audio signals comprises modifying the spatial metadata by adjusting one or more parameters within the spatial metadata; and reproducing the spatially aligned audio signals from two or more loudspeakers based on the aligning.

\* \* \* \* \*